June 25, 1929. M. PIPKIN 1,718,487
APPARATUS FOR FROSTING GLASS ARTICLES
Original Filed May 12, 1926 2 Sheets-Sheet 1
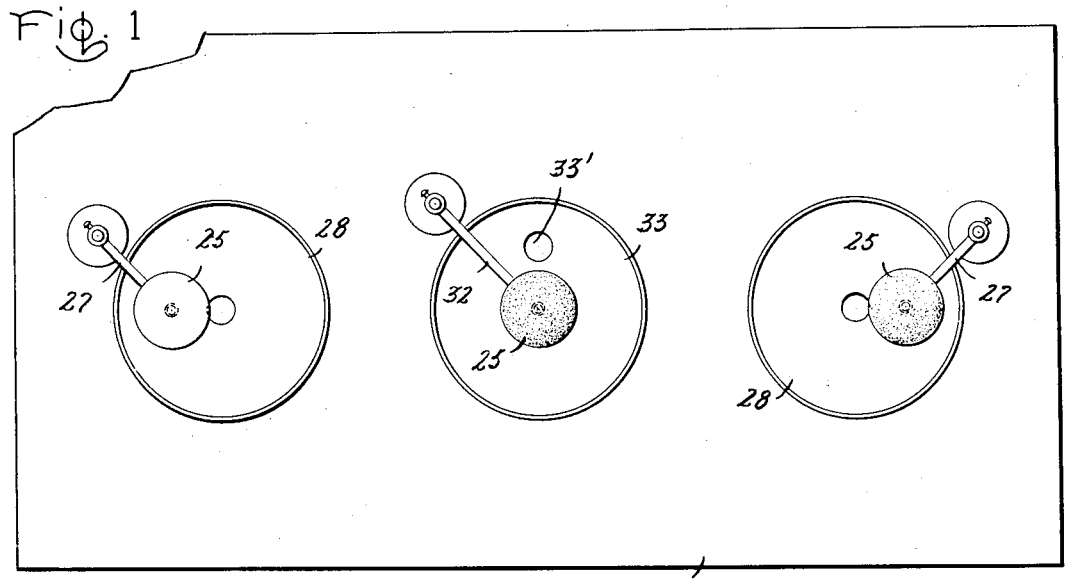
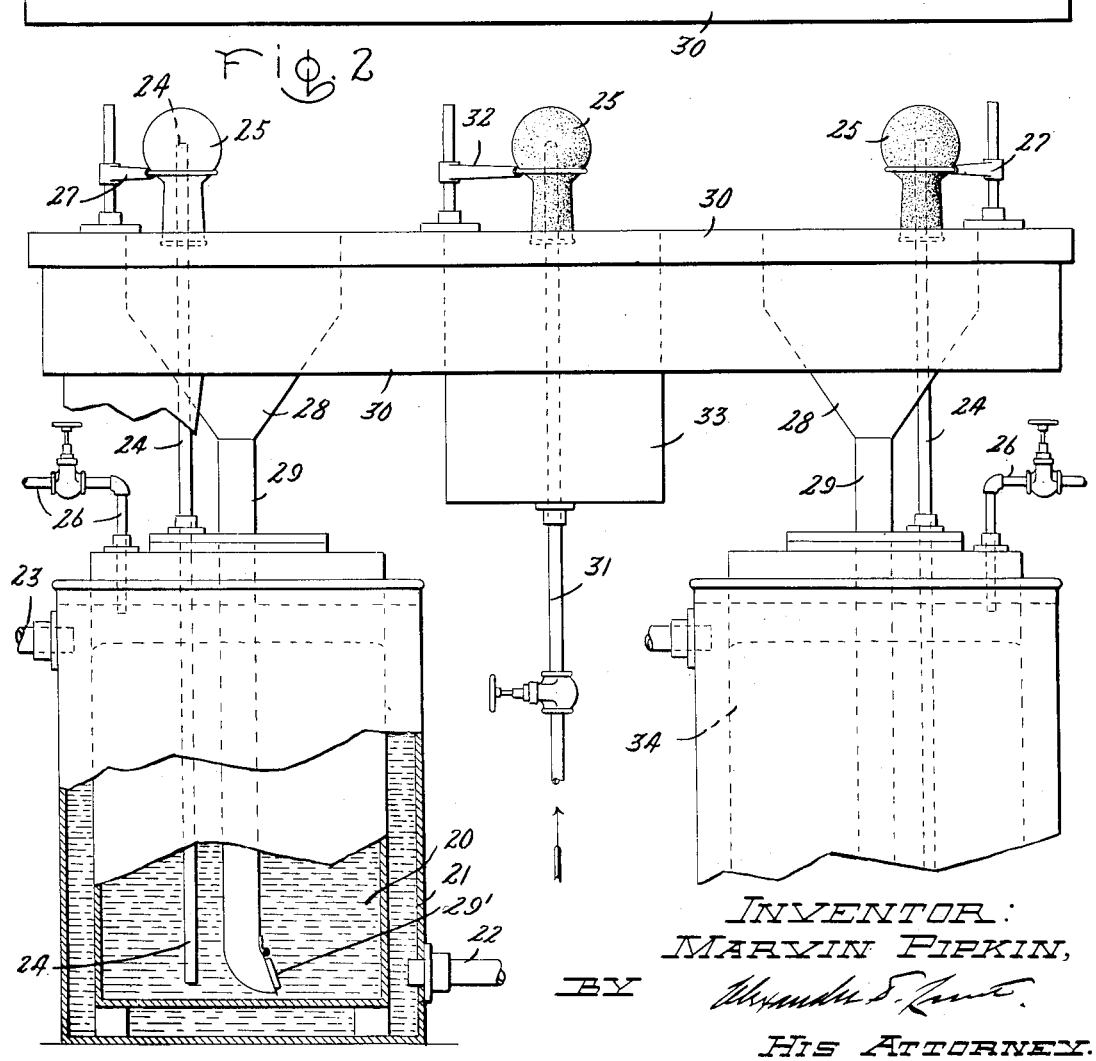
INVENTOR:
MARVIN PIPKIN,
BY
HIS ATTORNEY.

June 25, 1929.  M. PIPKIN  1,718,487
APPARATUS FOR FROSTING GLASS ARTICLES
Original Filed May 12, 1926   2 Sheets-Sheet 2
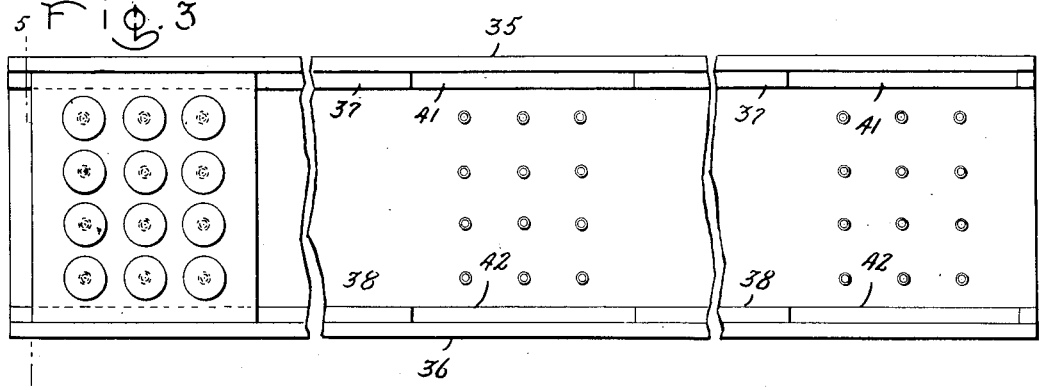
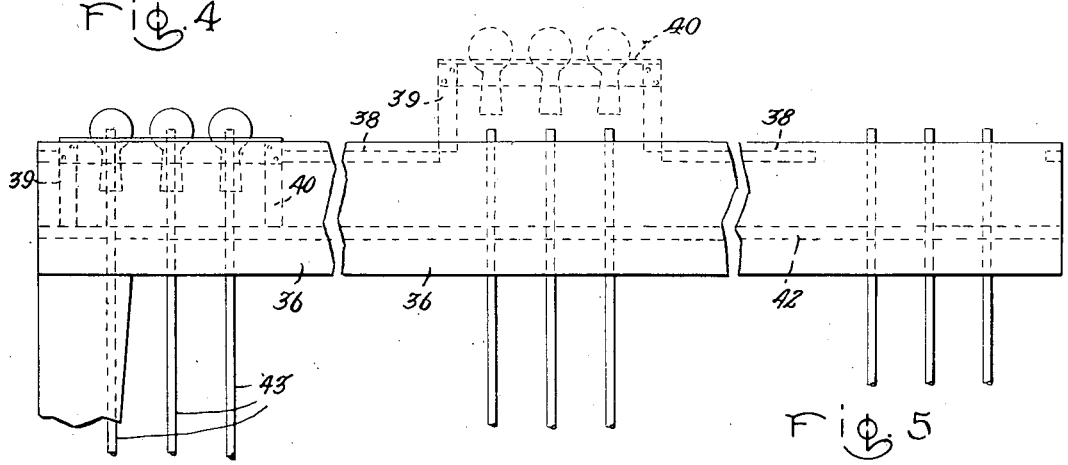
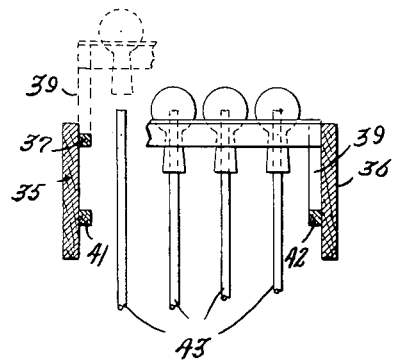
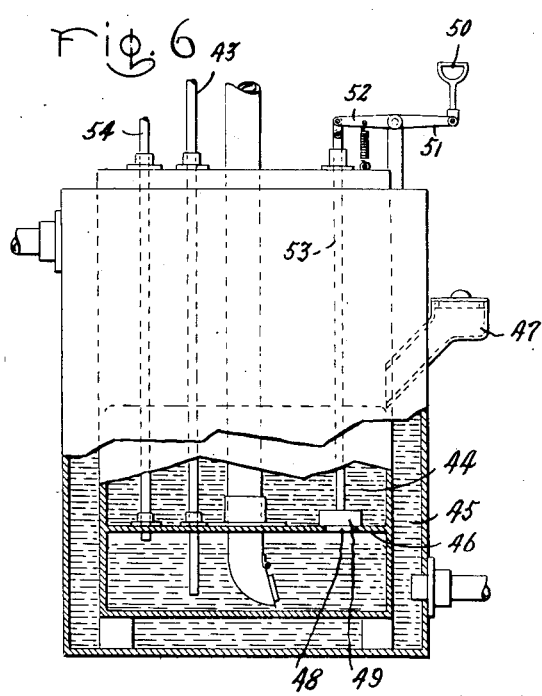
INVENTOR
MARVIN PIPKIN
BY
HIS ATTORNEY Patented June 25, 1929.

1,718,487

UNITED STATES PATENT OFFICE.

MARVIN PIPKIN, OF CLEVELAND HEIGHTS, OHIO, ASSIGNOR TO GENERAL ELECTRIC COMPANY, A CORPORATION OF NEW YORK.

APPARATUS FOR FROSTING GLASS ARTICLES.

Application filed May 12, 1926, Serial No. 108,648. Renewed June 20, 1928.

My invention relates to apparatus for frosting the inside of hollow glass articles by etching, and more particularly to apparatus for frosting by etching bulbs for electric incandescent lamps and other similar devices. Still more particularly, my invention relates to apparatus adapted for use in the process disclosed in my application Serial No. 40,152, filed June 29, 1925, of which the present application is a continuation in part.

According to my invention, I provide a suitable receptacle for receiving the frosting solution or mixture. Arranged above the said receptacle is located means for receiving the bulb or other hollow glass article which is to be treated. The arrangement is such that the said article is supported with its open end extending downwardly. A discharge pipe from the receptacle is mounted so that when the glass article is placed in the apparatus, the fluid may be discharged into the said article. A drain is provided so that the excess liquid flows back into the receptacle. Another feature of my invention is that adjacent the apparatus just described there is mounted a means for washing the treated glass article. Inasmuch as the process disclosed in my application hereinbefore referred to comprises a strengthening treatment for the frosted article, means are mounted adjacent the washing apparatus for applying this strengthening treatment. This apparatus may be substantially the same as that first described. The object of my invention is to provide a convenient and efficient apparatus which will reduce waste of the treating solutions and lend to cleanliness. Further features and advantages will appear from a detailed description of species thereof which follows.

In the drawing, Fig. 1 is a plan and Fig. 2 an elevation of a specific embodiment of my invention; Fig. 3 is a plan view of a modification; Fig. 4 is an elevation thereof; Fig. 5 is a fragmentary vertical section on the line 5—5 of Fig. 3; and Fig. 6 is an elevation, partially in section, of a modification of the reservoir and associated parts. As shown in Figs. 1 and 2 of the drawing, the apparatus comprises a suitable reservoir surrounded by a water jacket 21 having inlet and outlet pipes 22 and 23 respectively. A suitable frosting solution is placed in the reservoir 20, and is maintained at a suitable temperature by warm water circulated through the water jacket. A discharge pipe 24 leads from the bottom of the reservoir and extends upwardly a sufficient distance so that it is convenient to place the bulb 25 over the end thereof. An air inlet pipe 26 is provided which leads into the top of the reservoir. An ordinary bracket support 27 is provided to receive the bulb. A funnel-shaped drain 28 is provided below the bulb and this leads into a pipe 29 which extends to the bottom of the reservoir and is provided with a valve 29'. The latter opens outwardly when the head of the liquid contained in the pipe 29 is sufficient to overcome the pressure on the other side of the valve. The table 30 which supports the bracket 27 and funnel 28 preferably also supports the rest of the apparatus. This comprises a washing means comprising the pipe 31 which is vertically disposed with its end extending above the table 30. A suitable bracket support 32 is provided to receive the bulb. A reservoir 33 having an opening 33' in the bottom thereof is adapted to receive the wash water. On the same frame is also mounted the apparatus for giving the bulbs a strengthening treatment which is described in my application hereinbefore referred to. The parts of this apparatus are preferably substantially the same as that provided for the first treatment. As disclosed in the application hereinbefore referred to, the strengthening solution contained in the reservoir 34 is preferably somewhat weaker than that used in the reservoir 20.

In Figs. 3, 4, and 5 is illustrated a modification which allows the treatment of a plurality of articles at one time. This apparatus comprises a frame having two sides 35 and 36. Upper strips 37 and 38 are mounted on the respective sides. These strips are interrupted at the treating stations and may serve as tracks. The support for the bulbs or other articles is a small table having legs 39 and top 40 which has therein a plurality of apertures through which the necks of the bulbs project. Stops 41 and 42 are provided so that the legs of the support table may rest thereon and these are placed low enough so that the frosting solution discharge pipes 43 project up into the necks of the bulbs. In practice, the operator fills the table holder with bulbs and places the same over the discharge pipes. After the frosting treatment, the holder is raised and rested on strips 37 and 38 along which it may be slid to the washing station. After washing, the holder with its bulbs may be in like manner transferred to the third or treating station.

In Fig. 6 is shown a modified reservoir. This comprises the inner receptacle 44 surrounded by water jacket 45. The former has a false bottom 46. Above the latter, fresh solution is stored, being fed through inlet 47. A port 48 is provided in the false bottom 46 and this is controlled by a suitable valve 49 which may be seated or unseated by means of a handle 50 connected by levers 51 and 52 to the valve rod 53. Fresh solution may be supplied from time to time in this way to the used solution in the lower compartment in order to keep its strength uniform. At such times, the air supply through pipe 54 is shut off.

What I claim as new and desire to secure by Letters Patent of the United States is:

1. In an apparatus for frosting glass articles, the combination of a frame, a removable table supported thereon having apertures therein for receiving a plurality of articles, a plurality of receptacles containing treating solutions mounted below said frame, a plurality of nozzles, means for forcing said liquid through said receptacles, means whereby said tables are caused to register so as to bring each of said articles over a nozzle, and intermediate supports carried by said frame for receiving said tables between treatments.

2. In an apparatus for frosting glass articles, the combination of a frame, a removable table supported thereon having apertures therein for receiving a plurality of articles, a plurality of receptacles containing treating solutions mounted below said frame, a plurality of nozzles, means for forcing said liquid through said receptacles, and tracks on said frame having interruptions therein so as to bring said articles into registry with said nozzles.

3. In an apparatus for frosting glass articles, the combination of a frame having two superposed tracks, a removable table having apertures therein to receive glass articles, a plurality of receptacles having nozzles extending therefrom and adapted to contain treating solutions, and means for causing a discharge of said solutions through said nozzles, the upper of said tracks being interrupted at the treating stations to allow the aforesaid table to be lowered into contact with the lower track to bring the articles into registry with said nozzles.

In witness whereof, I have hereunto set my hand this 10th day of May, 1926.

MARVIN PIPKIN.